United States Patent
Da et al.

(10) Patent No.: US 12,474,958 B2
(45) Date of Patent: Nov. 18, 2025

(54) TASK SCHEDULING BASED ON SCHEDULING MODE

(71) Applicant: Beijing Youzhuju Network Technology Co., Ltd., Beijing (CN)

(72) Inventors: Yu Da, Beijing (CN); Tao Li, Beijing (CN); Haizhao Luo, Beijing (CN); Yongsu Zhang, Beijing (CN); Kairui She, Beijing (CN); Yu Zhang, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/002,531

(22) Filed: Dec. 26, 2024

(65) Prior Publication Data
US 2025/0130854 A1 Apr. 24, 2025

Related U.S. Application Data

(63) Continuation of application No. PCT/CN2023/112645, filed on Aug. 11, 2023.

(30) Foreign Application Priority Data

Aug. 11, 2022 (CN) .......................... 202210964273.2

(51) Int. Cl.
*G06F 9/48* (2006.01)
*G06F 9/54* (2006.01)
(52) U.S. Cl.
CPC ............ *G06F 9/4881* (2013.01); *G06F 9/547* (2013.01); *G06F 2209/544* (2013.01); *G06F 2209/548* (2013.01)

(58) Field of Classification Search
None
See application file for complete search history.

(56) References Cited

U.S. PATENT DOCUMENTS 7,451,447 B1 * 11/2008 Deshpande ........... G06F 9/4812
718/103
9,304,817 B2 * 4/2016 Kim ...................... G06F 9/5038
(Continued)

FOREIGN PATENT DOCUMENTS

| CN | 107977268 A | 5/2018 |
| CN | 112130963 A | 12/2020 |

(Continued)

OTHER PUBLICATIONS

Al-Wattar et al. "Efficient On-line Hardware/Software Task Scheduling for Dynamic Run-time Reconfigurable Systems", 2012 IEEE, pp. 401-406.*

(Continued)

*Primary Examiner* — Van H Nguyen
(74) *Attorney, Agent, or Firm* — Astute IP Law Group

(57) ABSTRACT

Embodiments of the present disclosure relate to a method for task scheduling and an electronic device. The method comprises: based on determining there is a task to be scheduled in an online task set of a waiting queue, an electronic device schedules the task based on a preset online scheduling mode which may be a sequential mode, a throughput mode, or a round-robin mode. Accordingly, at least one processing engine of the electronic device can process the task.

12 Claims, 6 Drawing Sheets

(56) References Cited

U.S. PATENT DOCUMENTS

| | | | | |
|---|---|---|---|---|
| 10,984,011 B1* | 4/2021 | Bishop | .................. | G06F 9/5083 |
| 11,206,221 B1* | 12/2021 | Guo | ..................... | H04L 47/623 |
| 2002/0165754 A1* | 11/2002 | Tang | ............... | G06Q 10/06314 |
| | | | | 700/99 |
| 2019/0114202 A1* | 4/2019 | Wang | ................... | G06F 9/5044 |

FOREIGN PATENT DOCUMENTS

| | | | | |
|---|---|---|---|---|
| CN | 113282381 A | 8/2021 | | |
| CN | 114579279 A | 6/2022 | | |
| WO | WO-2018059423 A1 * | 4/2018 | ............... | G06F 9/50 |

OTHER PUBLICATIONS

Khuat et al. "Dynamic Run-time Hardware/Software Scheduling for 3D Reconfigurable SoC", 2014 IEEE, 4 pages.*

Hong et al. "On-line Scheduling of the Run-time Tasks", 1988 IEEE, pp. 244-250.*

Baruah et al. "On-Line Scheduling to Maximize Task Completions", 1994 IEEE, pp. 228-236.*

International Search Report for PCT/CN2023/112645, mailed on Oct. 23, 2023, 5 pages.

* cited by examiner

TASK SCHEDULING BASED ON SCHEDULING MODE

CROSS-REFERENCE TO RELATED APPLICATION(S)

The present application is a continuous application of International Patent Application No. PCT/CN2023/112645, filed on Aug. 11, 2023, which claims priority to Chinese Patent Application No. 202210964273.2, filed with the China National Intellectual Property Administration on Aug. 11, 2022 and entitled "METHOD FOR TASK SCHEDULING AND ELECTRONIC DEVICE", the disclosures of which are incorporated herein by reference in their entireties.

FIELD

Embodiments of the present disclosure mainly relate to the field of computer technologies, and more specifically, to a method and an apparatus for task scheduling, an electronic device, a computer-readable storage medium, and a computer program product.

BACKGROUND

With the development of technologies, requirements for and capabilities of processing computing capabilities are also gradually increasing. For example, in the field of Artificial Intelligence (AI), a certain AI computing task may require a plurality of processing units to separately process different parts of data.

In a scenario of processing a large number of tasks, how to fully and effectively schedule the tasks is one of the current issues to be addressed.

SUMMARY

According to example embodiments of the present disclosure, there is provided a technical solution for task scheduling, which can ensure that online tasks are preferentially processed, and can be adapted to various different scenarios, thereby achieving effective utilization of resources.

In a first aspect of the present disclosure, there is provided a method for task scheduling. The method includes: determining whether there is a task to be scheduled in an online task set of a waiting queue; and in accordance with a determination that there is the task to be scheduled in the online task set, scheduling the task to be scheduled in the online task set based on a preset online scheduling mode, where the preset online scheduling mode includes a sequential mode, a throughput mode, or a round-robin mode.

In a second aspect of the present disclosure, there is provided an electronic device. The electronic device includes: at least one processing unit; and at least one memory, the at least one memory being coupled to the at least one processing unit and storing instructions executable by the at least one processing unit, the instructions, when executed by the at least one processing unit, causing the electronic device to perform an action, the action including: determining whether there is a task to be scheduled in an online task set of a waiting queue; and in accordance with a determination that there is the task to be scheduled in the online task set, scheduling the task to be scheduled in the online task set based on a preset online scheduling mode, where the preset online scheduling mode includes a sequential mode, a throughput mode, or a round-robin mode.

In a third aspect of the present disclosure, there is provided an apparatus for task scheduling. The apparatus includes: a determination module configured to determine whether there is a task to be scheduled in an online task set of a waiting queue; and a scheduling module configured to: in accordance with a determination that there is the task to be scheduled in the online task set, schedule the task to be scheduled in the online task set based on a preset online scheduling mode, where the preset online scheduling mode includes a sequential mode, a throughput mode, or a round-robin mode.

In a fourth aspect of the present disclosure, there is provided a computer-readable storage medium having machine-executable instructions stored thereon, the machine-executable instructions, when executed by a device, causing the device to perform the method described in accordance with the first aspect of the present disclosure.

In a fifth aspect of the present disclosure, there is provided a computer program product including computer-executable instructions, where the computer-executable instructions, when executed by a processor, implement the method described in accordance with the first aspect of the present disclosure.

In a sixth aspect of the present disclosure, there is provided an electronic device including: a processing circuit configured to perform the method described in accordance with the first aspect of the present disclosure.

This Summary part is provided to present a series of concepts in a simplified form, which will be further described in the following detailed embodiments. This part is not intended to identify key features or necessary features of the present disclosure, nor is it intended to limit the scope of the present disclosure. Other features of the present disclosure will become readily understandable through the following description.

BRIEF DESCRIPTION OF THE DRAWINGS

The above and other features, advantages, and aspects of embodiments of the present disclosure will become more apparent with reference to the following detailed descriptions in conjunction with the accompanying drawings. In the drawings, the same or similar reference numerals denote the same or similar elements, where.

DETAILED DESCRIPTION OF EMBODIMENTS

Figure 1:
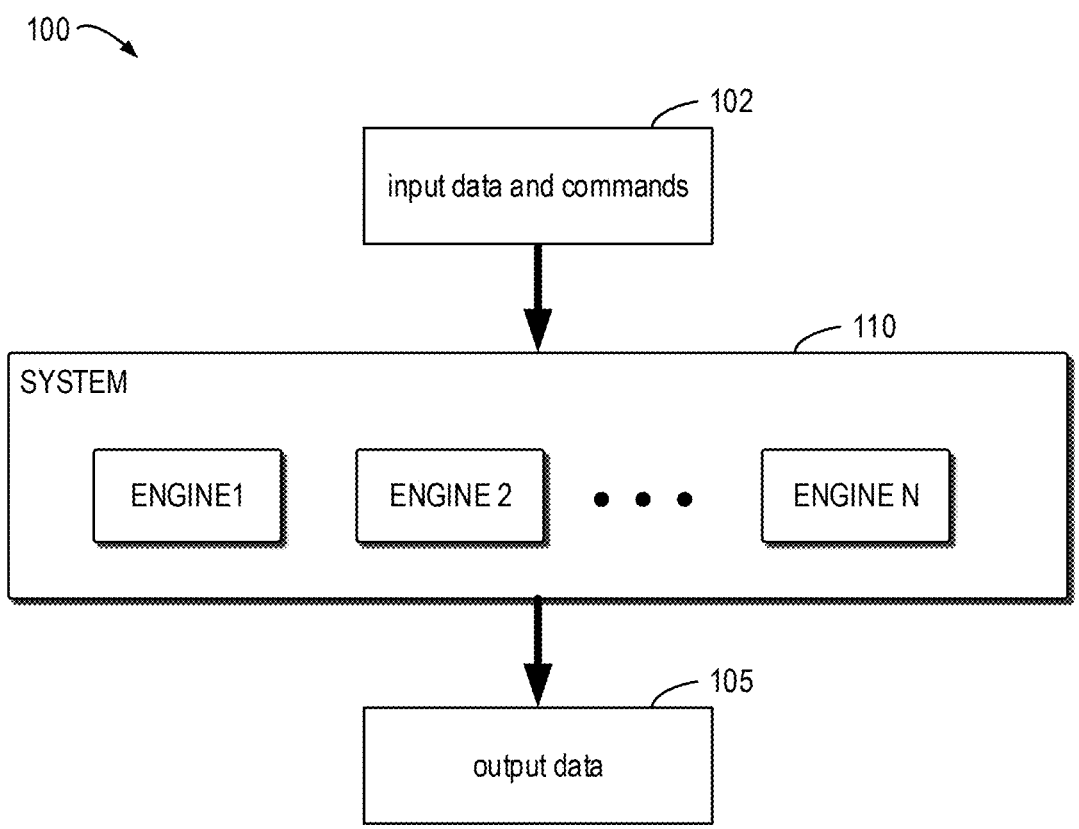
FIG. 1 illustrates a schematic diagram of a scenario in which embodiments of the present disclosure can be applied.

Embodiments of the present disclosure are described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the drawings and embodiments of the present disclosure are only for illustrative purposes and are not intended to limit the scope of protection of the present disclosure.

With the rapid improvement of requirements for and capabilities of processing chips/accelerators, there are often a plurality of processing engines inside a system (or a module). The processing engines are generally responsible for performing specific computing tasks. For example, a single computing task (such as an AI task) may use a plurality of processing engines to separately calculate different parts of data.

Technologies such as AI are widely used in Internet services. To improve the utilization of hardware resources, a feasible method is mixed deployment, that is, online tasks and offline tasks are deployed on hardware computing resources at the same time. The online tasks are generally responsible for processing computations related to current user requests, and require a short response time. The offline tasks generally belong to non-user-request-related computations, and do not require a quick response, but generally have a large amount of computation and occupy many resources. After the online tasks and the offline tasks are mixedly deployed, they use the same processing module, and a plurality of processing engines inside the module are used together. However, there is currently no effective way to schedule the online tasks and the offline tasks.

To at least partially solve the defects in the above technical solutions, embodiments of the present disclosure provide a technical solution for task scheduling. By preferentially scheduling tasks in an online task set, the delay requirements of the online tasks are ensured. In addition, scheduling the online tasks based on a preset online scheduling mode can be adapted to different scenarios, and can make full use of processing resources of processing units, thereby improving task processing efficiency.

FIG. 1 illustrates a schematic diagram of a scenario 100 in which embodiments of the present disclosure can be applied. As shown in FIG. 1, a system 110 for processing tasks may include a plurality of processing engines, such as Engine 1 to Engine N shown in FIG. 1. The system 110 can obtain input data and commands 102, and process the input data and commands 102 using Engine 1 to Engine N to obtain output data 104.

In some embodiments, the input data and commands 102 may include a plurality of tasks, e.g., including a plurality of online tasks and/or a plurality of offline tasks.

In the embodiments of the present disclosure, the term "processing engine" may be referred to as "engine", "processing unit", "processing module", or other names, which is not limited in the present disclosure. As an example, in the following description, "processing unit" is used as a non-restrictive example for description. Correspondingly, a system for task scheduling and processing may include a plurality of processing units. It may be understood that the plurality of processing units may be implemented in any of the following: a plurality of independent hardware devices, a plurality of hardware units (such as a plurality of processors) in a single hardware device, a plurality of Peripheral Component Interconnect Express (PCIE) cards, a plurality of chips on a single PCIE card, or a plurality of modules or a plurality of units in a single chip, etc., which is not limited in the present disclosure.

In the embodiments of the present disclosure, the terms "received task" and "arrived task" may be used interchangeably in some scenarios. In the embodiments of the present disclosure, the term "task" may be referred to as a subtask, a thread, or other names, which is not limited in the present disclosure. In some examples, the task may include an AI task, such as an AI computing task such as AI training or AI inference.

Figure 2:
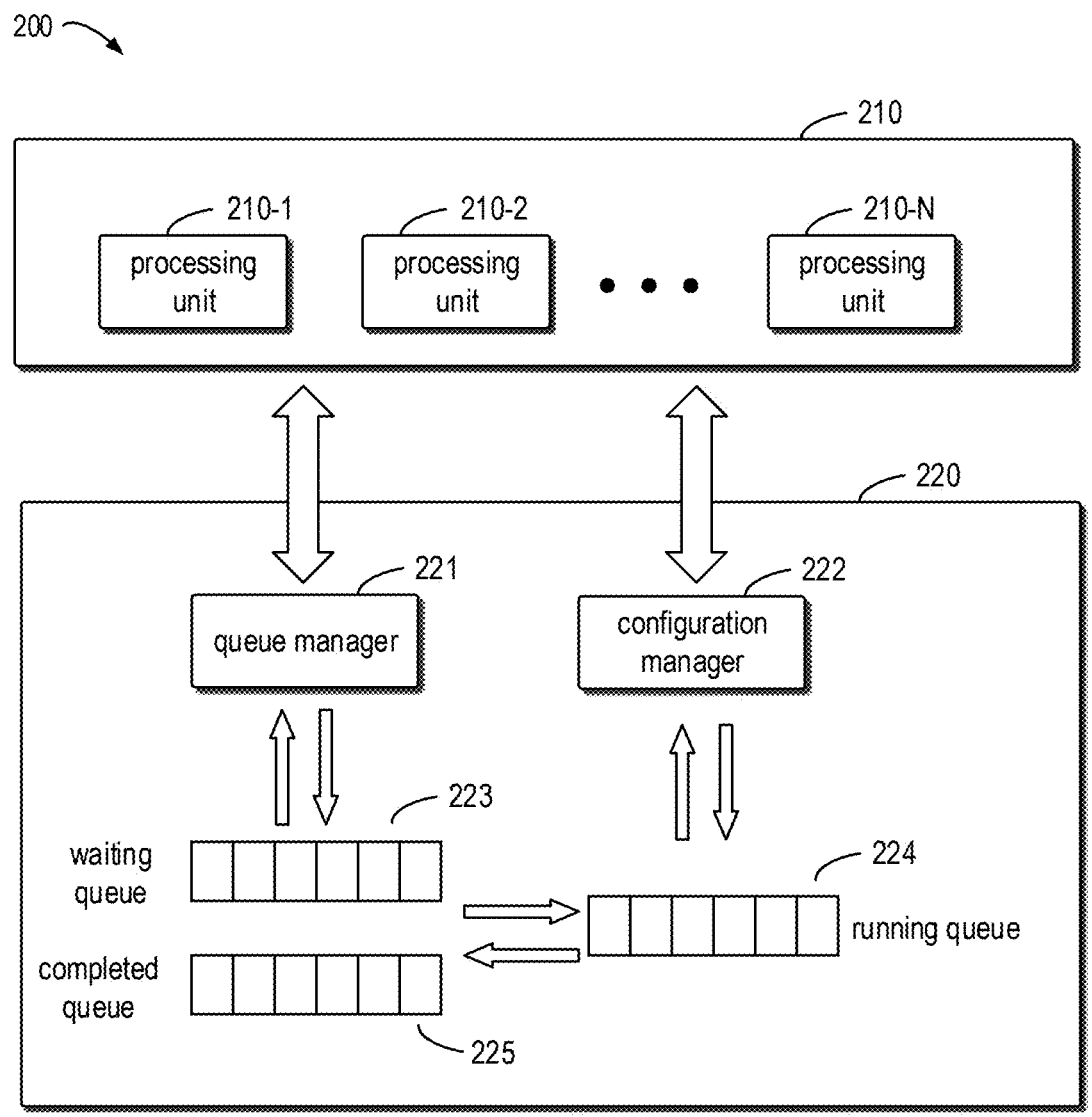
FIG. 2 illustrates a schematic diagram of an example architecture of a system according to some embodiments of the present disclosure.

FIG. 2 illustrates a schematic diagram of an example architecture of a system 200 according to some embodiments of the present disclosure. As shown in FIG. 2, the system 200 includes a plurality of processing units 210 and a scheduler 220. The plurality of processing units 210 include a processing unit 210-1 to a processing unit 210-N. The scheduler 220 includes a queue manager 221, a configuration manager 222, a waiting queue 223, a running queue 224, and a completed queue 225.

Exemplarily, the queue manager 221 may be configured to add a received task to the waiting queue 223. The queue manager 221 may also schedule some or all tasks in the waiting queue 223 to the running queue 224 based on states of the plurality of processing units 210 and the like. For example, the queue manager 221 may comprehensively determine an appropriate task to be scheduled to the running queue 224 based on busy/idle information of the plurality of processing units 210 and the number of processing units required by the waiting task.

In the embodiments of the present disclosure, adding a task to a queue may also be referred to as enqueuing a task or the like, or may be referred to as other methods, which is not limited in the present disclosure.

Exemplarily, the configuration manager 222 may be configured to extract a task from the running queue 224, and process the extracted task. For example, the configuration manager 222 may analyze an instruction corresponding to the extracted task and configure one or more corresponding processing units 210 to start working. The configuration manager 222 may also add a completed task to the completed queue 225, and delete the completed task from the running queue 224.

Exemplarily, the queue manager 221 may also be configured to post-process a task in the completed queue 225. For example, post-processing may include releasing resources of a processing unit and the like.

In the embodiments of the present disclosure, the queue manager 221 of the scheduler 220 may add a received task to the waiting queue 223. Exemplarily, the queue manager 221 may add the task to the waiting queue 223 based on an attribute of the task, and/or a scheduling mode of the scheduler 220, or the like. Optionally, the scheduling mode may include a sequential mode, a throughput mode, a round-robin mode, and the like. Embodiments of the scheduling mode will be described in detail below.

Figure 3:
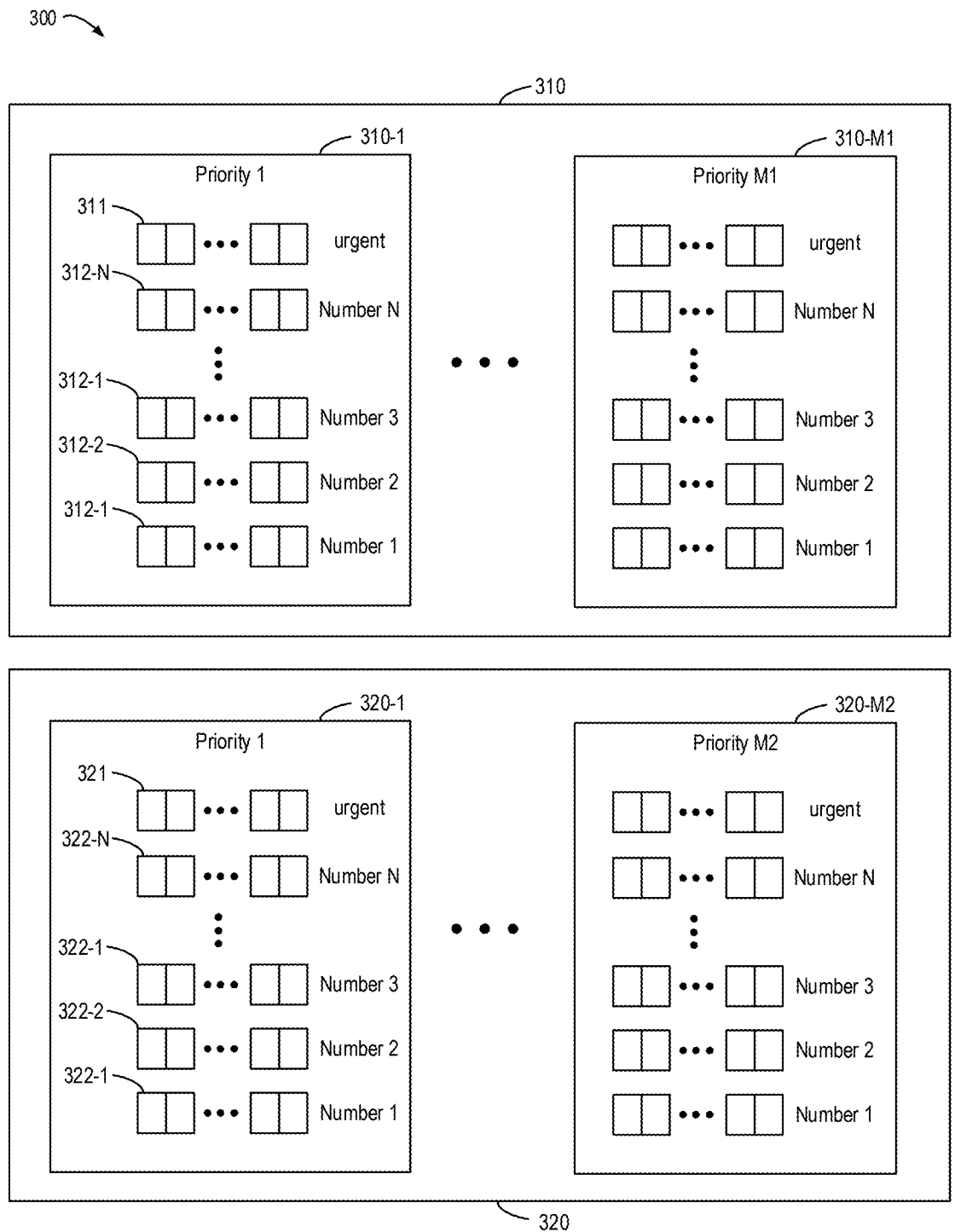
FIG. 3 illustrates a schematic diagram of a waiting queue according to some embodiments of the present disclosure.

In some embodiments of the present disclosure, to meet requirements of mixed deployment, the waiting queue 223 may include an online task queue set and an offline task queue set. FIG. 3 illustrates a schematic diagram of the waiting queue 223 according to some embodiments of the present disclosure. As shown in FIG. 3, the waiting queue 223 includes an online task set 310 and an offline task set 320.

The online task set 310 includes a plurality of online task subsets corresponding to a plurality of priorities. Exemplarily, the online task set 310 includes online task subsets 310-1 to 310-M1 respectively corresponding to priorities 1 to M1, where M1 is a positive integer. It may be understood that if M1=1, it means that the online task set 310 is not divided into online task subsets related to priorities. In some examples, it may be assumed that the priorities 1 to M1 represent priorities from low to high, that is, the priority M1 is the highest priority. It should be understood that in some other examples, it may also be assumed that the priority 1 is the highest priority, which is not limited in the present disclosure.

In some embodiments, each of the online task subsets 310-1 to 310-M1 may include an urgent task queue and a plurality of resource matching task queues. Exemplarily, an online task subset 310-$i1$ may correspond to a priority $i1$ ($1 \le i1 \le M1$), and a task in an urgent task queue of the online task subset 310-$i1$ has a higher urgency than a task in the plurality of resource matching task queues, and needs to be processed preferentially. In addition, the plurality of resource matching task queues of the online task subset 310-$i1$ correspond to a required number of processing units.

The online task subset 310-1 is taken as an example, which includes an urgent task queue 311 and a plurality of resource matching task queues 312-1 to 312-N. Exemplarily, a resource matching task queue 312-$j$ indicates that a task therein requires j processing units, where $1 \le j \le N$.

The offline task set 320 includes a plurality of offline task subsets corresponding to a plurality of priorities. Exemplarily, the offline task set 320 includes offline task subsets 320-1 to 320-M2 respectively corresponding to priorities 1 to M2, where M2 is a positive integer. It may be understood that if M2=1, it means that the offline task set 320 is not divided into offline task subsets related to priorities. In some examples, it may be assumed that the priorities 1 to M2 represent priorities from low to high, that is, the priority M2 is the highest priority. It should be understood that in some other examples, it may also be assumed that the priority 1 is the highest priority, which is not limited in the present disclosure. In addition, it may be understood that M1 and M2 may be separately set based on online tasks and offline tasks, and the two may be equal or unequal, which is not limited in the present disclosure.

In some embodiments, each of the offline task subsets 320-1 to 320-M2 may include an urgent task queue and a plurality of resource matching task queues. Exemplarily, an offline task subset 320-$i2$ may correspond to a priority $i2$ ($1 \le i2 \le M2$), and a task in an urgent task queue of the offline task subset 320-$i2$ has a higher urgency than a task in the plurality of resource matching task queues, and needs to be processed preferentially. In addition, the plurality of resource matching task queues of the offline task subset 320-$i2$ correspond to a required number of processing units.

The offline task subset 320-1 is taken as an example, which includes an urgent task queue 321 and a plurality of resource matching task queues 322-1 to 322-N. Exemplarily, a resource matching task queue 322-$j$ indicates that a task therein requires j processing units, where $1 \le j \le N$.

In this way, the tasks in the embodiments of the present disclosure are divided into three hierarchical priorities, and the priority of the online tasks is higher than that of the offline tasks. In all online tasks (or offline tasks), different task subsets have different priorities. In a specific priority online task subset (or an offline task subset), the priority of a task in an urgent queue is higher than that of a task in a resource matching queue.

It should be noted that the waiting queue 223 shown in FIG. 3 is only a schematic diagram, and those skilled in the art may modify it to obtain other solutions on this basis. For example, the first hierarchical level of the three hierarchical levels is online and offline, the second hierarchical level is urgent and a plurality of resource matching queues, and the third hierarchical level is different priorities. This is not limited in the present disclosure.

It should be noted that the waiting queue 223 shown in FIG. 3 is only an example of the embodiment of the present disclosure. In the actual task scheduling process, some task subsets in the waiting queue 223 may be empty, and a certain queue may be empty, depending on an actual task to be processed. In some examples, it may be determined depending on a scheduling mode, as described in detail in the following embodiments.

Exemplarily, the queue manager 221 of the scheduler 220 may continuously receive new tasks without having to wait until the waiting queue 223 (or a task subset therein) is empty before receiving new tasks. In this way, the real-time performance can be ensured, and the delay caused by task reception can be avoided, so that the efficiency of task processing can be ensured.

In some embodiments, the scheduler 220 (such as the queue manager 221) may receive a new task, and add the new task to a corresponding position of the waiting queue 223 based on an attribute of the task. Exemplarily, the attribute of the task may include one or more of the following: online or offline, priority, whether it is urgent, a required number of processing units, and the like.

For example, for a newly arrived task, it may be first determined whether the task is an online task or an offline task, and then a corresponding online task subset or offline task subset is determined based on a priority, and finally the task is added to a corresponding queue based on whether it is urgent and/or a required number of processing units. For example, an urgent task is added to an urgent task queue, a task requiring one processing unit is added to a resource matching task queue corresponding to the number 1, . . . , a task requiring n processing units is added to a resource matching task queue corresponding to the number n, . . . .

In some embodiments, the scheduler 220 (such as the queue manager 221) may receive a new task, and add the new task to a corresponding position of the waiting queue 223 based on a scheduling mode of the scheduler 220 and an attribute of the task. Exemplarily, the scheduling mode may include a sequential mode, a throughput mode, and a round-robin mode. The attribute of the task may include one or more of the following: online or offline, priority, whether it is urgent, a required number of processing units, and the like.

For example, an online scheduling mode of the scheduler 220 for online tasks may be at least one of a sequential mode, a throughput mode, or a round-robin mode, and an offline scheduling mode of the scheduler 220 for offline tasks may be a throughput mode.

In some examples, if a newly arrived task is an online task, the task may be added to a corresponding position of the waiting queue 223 based on a scheduling mode and an attribute of the task. Specifically, if the scheduling mode is a sequential mode, the online task is added to an urgent task queue of an online task subset corresponding to a priority based on the priority of the online task. That is, the resource matching queue is not used in the sequential mode, and all online tasks are in the urgent task queue. Optionally, in the sequential mode, the urgent task queue may be set to first-in first-out. Specifically, if the scheduling mode is a round-robin mode, the task may be added to a corresponding position of the waiting queue 223 based on a priority and a required number of processing units of the task without considering whether the task attribute is urgent. Specifically, if the scheduling mode is a throughput mode, the task is added to a corresponding position of the waiting queue 223 based on an attribute of the task, as described in the related descriptions in the foregoing embodiments.

In some examples, if a newly arrived task is an offline task, the task is added to a corresponding position of the waiting queue 223 based on an attribute of the task, as described in the related descriptions in the foregoing embodiments.

In some embodiments of the present disclosure, a scheduling mode of the scheduler 220 for online tasks and a scheduling mode of the scheduler 220 for offline tasks may be the same or different. In some examples, the scheduling mode of the scheduler 220 may be a throughput mode, and remains unchanged when scheduling online tasks and offline tasks. In some examples, the scheduling mode of the scheduler 220 for online tasks is a sequential mode or a round-robin mode, and the scheduling mode of the scheduler 220 for offline tasks is a throughput mode, the scheduler 220 may switch the scheduling modes between scheduling online tasks and offline tasks. For example, when the scheduler starts to schedule offline tasks, it switches to the throughput mode, and then switches back to the sequential mode or the round-robin mode when scheduling online tasks.

In this way, in the embodiment of the present disclosure, a throughput mode is used when scheduling offline tasks. Since offline tasks have almost no requirements for delay, through the throughput mode, the full utilization of resources can be maximized, thereby improving the resource utilization rate and the overall processing efficiency.

Figure 4:
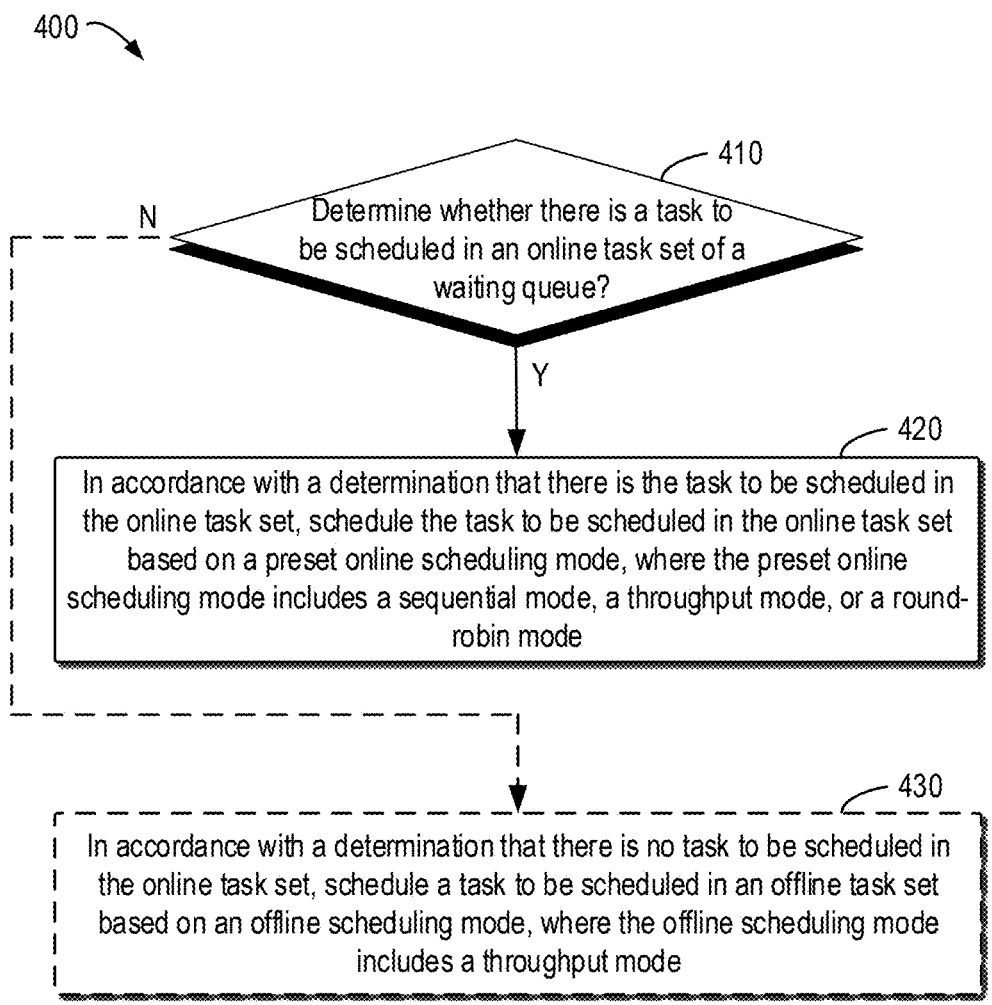
FIG. 4 illustrates a flowchart of an example process according to some embodiments of the present disclosure.

FIG. 4 illustrates a flowchart of an example process 400 according to some embodiments of the present disclosure. It should be understood that the process 400 may further include additional blocks not shown and/or some blocks shown may be omitted. The scope of the present disclosure is not limited in this respect. Exemplarily, the process 400 shown in FIG. 4 may be performed by the system 200 of FIG. 2 described above, for example, performed by the scheduler 220.

At block 410, it is determined whether there is a task to be scheduled in an online task set of a waiting queue. At block 420, in accordance with a determination that there is the task to be scheduled in the online task set, the task to be scheduled in the online task set is scheduled based on a preset online scheduling mode, where the preset online scheduling mode includes a sequential mode, a throughput mode, or a round-robin mode.

In this way, the embodiments of the present disclosure can preferentially schedule online tasks, ensure the delay requirements of the online tasks, and schedule the online tasks based on the preset online scheduling mode, which can be adapted to different scenarios, and ensure the effective utilization of resources.

In the embodiments of the present disclosure, an online scheduling mode may be set based on an actual scenario of tasks. In this way, the system in the embodiments of the present disclosure has greater flexibility, and can schedule tasks in various different scenarios to achieve resource allocation requirements in various scenarios.

Optionally or additionally, as shown in FIG. 4, at block 430, in accordance with a determination that there is no task to be scheduled in the online task set, a task to be scheduled in an offline task set is scheduled based on an offline scheduling mode, where the offline scheduling mode includes a throughput mode.

In some embodiments, the waiting queue may include an online task set and an offline task set, and whether the online task set is empty may be determined. It may be understood that the online task set being empty indicates that there is no task to be scheduled (or processed) in the online task set. In contrast, the online task set not being empty indicates that there is a task to be scheduled (or processed) in the online task set.

In some embodiments, for an arrived task (or a received task), the queue manager 221 may add the task to a corresponding position of the waiting queue based on an attribute of the task, or based on the attribute of the task and a scheduling mode.

In some examples, if the arrived task is an online task and the scheduling mode is a sequential mode, the task may be added to an urgent task queue, in the online task set, corresponding to a priority of the task. Optionally, if the scheduling mode is a sequential mode, the priority of the arrived task is determined, and then an online task subset corresponding to the priority is determined, and the task is added to the urgent task queue of the corresponding online task subset, e.g., the urgent task queue 311 shown in FIG. 3. In this way, only the urgent task queue in the online task set is used for task scheduling (for example, it is non-empty), while the remaining resource matching task queues are all empty and are not used for task scheduling.

In some examples, if the arrived task is an online task and the scheduling mode is a round-robin mode, the task may be further added to a resource matching task queue, in an online task subset corresponding to a priority of the task, that corresponds to a number of processing units required by the task based on the priority of the task and the number of processing units required by the task. Optionally, if the scheduling mode is a round-robin mode, the arrived task will only be added to a resource matching task queue, e.g., the plurality of resource matching task queues 312-1 to 312-N shown in FIG. 3. In this way, only the resource matching task queues in the online task set are used for task scheduling (for example, they are non-empty), while the remaining urgent task queues are all empty and are not used for task scheduling.

In some examples, if the arrived task is an online task and the scheduling mode is a throughput mode, the task may be further added to an online task subset, in the online task set, corresponding to a priority of the task based on the priority of the task, whether the task is urgent, and a required number of processing units. Specifically, if the arrived task is an urgent online task, the task is added to an urgent task queue of the online task subset corresponding to the priority of the task. If the arrived task is a non-urgent online task, the task is added to a resource matching task queue, in the online task subset corresponding to the priority of the task, that corresponds to the required number of processing units based on the required number of processing units of the task.

In some examples, if the arrived task is an offline task, the task may be further added to an offline task subset, in the offline task set, corresponding to a priority of the task based on the priority of the task, whether the task is urgent, and a required number of processing units. Specifically, if the arrived task is an urgent offline task, the task is added to an urgent task queue of the offline task subset corresponding to the priority of the task. If the arrived task is a non-urgent offline task, the task is added to a resource matching task queue, in the offline task subset corresponding to the priority of the task, that corresponds to the required number of processing units based on the required number of processing units of the task.

In some embodiments, the sequential mode indicates that tasks to be scheduled in the online task set are scheduled in a chronological order. Specifically, the queue manager 221 may select a task to be scheduled from the waiting queue 223 based on the sequential mode, and add the task to the running queue 224. In this way, the configuration manager 222 can process the task in the running queue 224.

For example, if the preset online scheduling mode is a sequential mode, each task in the online task set of the waiting queue has its own timestamp, and the timestamp may represent a time when the task arrives or a time when the task is added to the waiting queue, which is not limited in the present disclosure. Exemplarily, when there is an idle processing unit and the task scheduling is further performed, the sequence may be determined based on the timestamp. In this way, the earliest arrived online task will be scheduled first, or it may be understood as a "first-in first-out" mechanism.

For example, if the preset online scheduling mode is a sequential mode, a non-empty online task subset with a highest priority may be determined, and tasks in the non-empty online task subset with the highest priority are scheduled in chronological order.

In some embodiments, the round-robin mode indicates that tasks to be scheduled in the plurality of online task subsets of the online task set are scheduled in a round-robin manner. Specifically, the queue manager 221 may select a task to be scheduled from the waiting queue 223 based on the round-robin mode, and add the task to the running queue 224. In this way, the configuration manager 222 can process the task in the running queue 224.

For example, if the preset online scheduling mode is a round-robin mode, each task in the online task set of the waiting queue has its own timestamp, and the timestamp may represent a time when the task arrives or a time when the task is added to the waiting queue, which is not limited in the present disclosure.

For example, if the preset online scheduling mode is a round-robin mode, a non-empty online task subset with a highest priority may be determined, and tasks in the non-empty online task subset with the highest priority are scheduled in a round-robin order of the plurality of resource matching task queues. Optionally, the round-robin order may be an order from large to small or from small to large corresponding numbers, which is not limited in the present disclosure.

Exemplarily, when there is an idle processing unit and the task scheduling is further performed, one task in an online task subset corresponding to the number 1 may be scheduled first, then one task in an online task subset corresponding to the number 2 may be scheduled, . . . , and then one task in an online task subset corresponding to the number N may be scheduled. Alternatively, exemplarily, when there is an idle processing unit and the task scheduling is further performed, one task in an online task subset corresponding to the number N may be scheduled first, then one task in an online task subset corresponding to the number N−1 may be scheduled, . . . , and then one task in an online task subset corresponding to the number 1 may be scheduled. In this way, it can be adapted to a scenario of ensuring fairness, and achieve fair scheduling of tasks in the plurality of online task subsets.

In some embodiments, the throughput mode indicates that tasks to be scheduled in urgent task queues of the plurality of task subsets are scheduled based on priorities first, and if the plurality of urgent task queues are empty, tasks to be scheduled in resource matching task queues of the plurality of task subsets are scheduled based on the priorities. Specifically, the queue manager 221 may select a task to be scheduled from the waiting queue 223 based on the throughput mode, and add the task to the running queue 224. In this way, the configuration manager 222 can process the task in the running queue 224.

As an example, an embodiment of scheduling a task in an online task set based on a throughput mode is described below. As described above, the online task set includes a plurality of online task subsets, the plurality of online task subsets correspond to a plurality of different priorities, and each of the plurality of online task subsets includes an urgent task queue and a plurality of resource matching task queues.

It may be understood that scheduling a task in the online task set based on a throughput mode may include: if the urgent task queue in the online task set is not empty, scheduling tasks in the urgent task queues of the plurality of online task subsets based on priorities; and if the urgent task queue in the online task set is empty, scheduling tasks in the resource matching task queues of the plurality of online task subsets based on the priorities.

Figure 5:
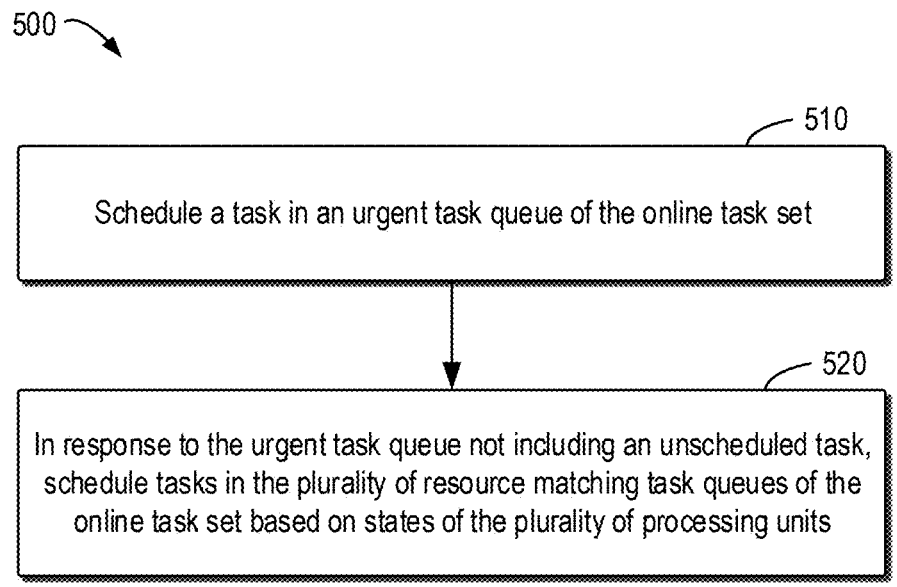
FIG. 5 illustrates a flowchart of an example process according to some embodiments of the present disclosure.

FIG. 5 illustrates a flowchart of an example process 500 of scheduling a task in an online task set according to some embodiments of the present disclosure. At block 510, a task in an urgent task queue of the online task set is scheduled. At block 520, in response to the urgent task queue not including an unscheduled task, tasks in the plurality of resource matching task queues of the online task set are scheduled based on states of the plurality of processing units.

In some embodiments, the online task set includes a plurality of urgent task queues with a plurality of priorities. Exemplarily, tasks in each of the plurality of urgent task queues may be scheduled sequentially in order of the priorities from high to low.

For example, it may be determined whether an urgent task queue with a highest priority is empty, and if it is not empty, a task in the urgent task queue with the highest priority is scheduled. If the urgent task queue with the highest priority is empty, it is determined whether an urgent task queue with a second highest priority is empty. In this way, the plurality of urgent task queues can be scheduled sequentially in order of priority.

For example, the plurality of urgent task queues include a first urgent task queue with a first priority, and the first urgent task queue includes a plurality of urgent tasks, then the plurality of urgent tasks may be scheduled in chronological order. In this way, for a certain urgent task queue, the scheduling may be performed in chronological order.

In some embodiments, if all the urgent task queues in the online any set are empty, tasks to be scheduled in the resource matching task queues of the plurality of task subsets may be scheduled based on priorities. Specifically, the scheduling may be performed based on the plurality of priorities and a current number of idle processing units. Exemplarily, a first number of processing units with an idle state in the plurality of processing units may be determined. A first target resource matching task queue in the plurality of online task subsets is determined, where the first target resource matching task queue is a non-empty queue with a highest priority in resource matching task queues corresponding to the first number. A task to be scheduled in the first target resource matching task queue is scheduled. In this way, when there is no urgent task, a task matching the first number may be preferentially scheduled.

Exemplarily, if resource matching task queues corresponding to the first number in the plurality of online task subsets are all empty, a second target resource matching task queue and a third target resource matching task queue in the plurality of online task subsets are determined, where the second target resource matching task queue is a non-empty queue with a highest priority in resource matching task queues corresponding to a second number, the third target resource matching task queue is a non-empty queue with a highest priority in resource matching task queues corresponding to a third number, and a sum of the second number and the third number is equal to the first number. Then a task to be scheduled in the second target resource matching task queue and a task to be scheduled in the third target resource matching task queue may be scheduled. In this way, when there is no task matching the first number, a task with a larger number of requirements may be preferentially scheduled, so that the idle processing units can be fully used. For example, the idle processing units may be used to the fullest extent possible in a combined manner, so that the resource utilization rate can be improved.

Exemplarily, each resource matching task queue in the plurality of online task subsets has a corresponding weight. Optionally, for each of the remaining resource matching task queues other than the first target resource matching task queue in the plurality of online task subsets, the corresponding weight is increased by a preset step value. In some examples, if a corresponding weight of a first resource matching task queue in the plurality of online task subsets reaches a preset threshold, tasks in the first resource matching task queue are all added to a first urgent task queue, where the first resource matching task queue and the first urgent task queue belong to a same online task subset. In this way, for a task in an unscheduled resource matching task queue, the weight may be increased, so that the task is added to the urgent task queue after not being scheduled for a plurality of times. In this way, the online task can be prevented from not being scheduled for a long time, so that a certain fairness can be ensured.

In some embodiments, if there is no unscheduled online task in the online task set, that is, the online task set is empty, tasks in the offline task set may be scheduled. Specifically, the offline tasks in the offline task set may be scheduled based on the throughput mode. Exemplarily, for the throughput mode, reference may be made to the above scheduling method for online tasks, and for the purpose of simplifying the example, details are not repeated here.

In some embodiments of the present disclosure, scheduling of the offline tasks may sample a slow-start mechanism. Specifically, considering the continuity of tasks, that is, the queue manager 221 may continuously receive new tasks. In the present disclosure, when scheduling the offline tasks, it may be attempted to receive new online tasks, so that the delay requirements of the online tasks can be ensured.

In some embodiments, if the online task set is empty, the offline tasks may not be scheduled immediately. In contrast, it may be attempted to receive new tasks first. If a new online task is successfully received, the online task may be scheduled. If a new online task is not successfully received (such as an offline task is received or no task is received), the offline task may be scheduled.

Exemplarily, it may be attempted to receive a new online task. If the new online task is not received through a first attempt, a first predetermined number of tasks in the offline task set are scheduled. If the new online task is not received through a second attempt, a second predetermined number of tasks in the offline task set are scheduled, where the second predetermined number is greater than the first predetermined number.

It may be understood that if a new online task is received in a certain attempt, the received online task is scheduled, so that the delay requirements of the online task can be ensured. If a new online task is still not received in a next attempt, the number of scheduled offline tasks may be increased until a predetermined maximum number (for example, 8 or other values).

For example, if there is no online task received in a first attempt, one offline task may be scheduled. If there is no online task received in a second attempt, two offline tasks may be scheduled. If there is no online task received in a third attempt, four offline tasks may be scheduled. If there is no online task received in a fourth attempt, eight offline tasks may be scheduled. It should be noted that the number of scheduled offline tasks given here is only an illustration and cannot be construed as a limitation on the embodiments of the present disclosure.

Exemplarily, when a plurality of offline tasks are scheduled, it may be based on a throughput mode. For example, the first predetermined number of tasks include a task to be scheduled in an urgent task list of the offline task set determined based on a priority order. If all the urgent task lists in the offline task set are empty, an offline task in resource matching task queues of a plurality of offline task subsets of the offline task set is scheduled based on priorities.

An offline scheduling mode for scheduling the offline tasks is a throughput mode. In some embodiments, when a new online task is received in a certain attempt, the online task may be continuously scheduled. Optionally, if the online scheduling mode is not a throughput mode, the scheduling mode may be switched to an online scheduling mode, for example, a sequential mode or a round-robin mode, so that automatic switching between different scheduling modes can be implemented.

The foregoing describes the task scheduling solution of the embodiments of the present disclosure in conjunction with FIGS. 1-5. In the embodiments of the present disclosure, the waiting queue 223 may be set as three hierarchical levels, so that it can be adapted to various different scenarios. For example, an online scheduling mode may be set based on the scenarios, thereby ensuring resource allocation requirements in different scenarios.

It should be understood that in the embodiments of the present disclosure, "first", "second", "third" and the like are only used to indicate that a plurality of objects may be different, but do not exclude that the two objects are the same, and should not be construed as any limitation to the embodiments of the present disclosure.

It should also be understood that the division of the methods, conditions, categories, and embodiments in the embodiments of the present disclosure is only for the convenience of description, and should not constitute a special limitation. The features of various methods, categories, conditions, and embodiments may be combined with each other under the condition of conforming to logic.

It should also be understood that the above descriptions are only to help those skilled in the art better understand the embodiments of the present disclosure, but are not intended to limit the scope of the embodiments of the present disclosure. Those skilled in the art can make various modifications, changes, or combinations based on the above contents. Such a modified, changed, or combined solution is also within the scope of the embodiments of the present disclosure.

It should also be understood that the descriptions of the above contents focus on emphasizing the differences between the embodiments, and the same or similar parts can be referred to or borrowed from each other. For the sake of brevity, details are not described here again.

Figure 6:
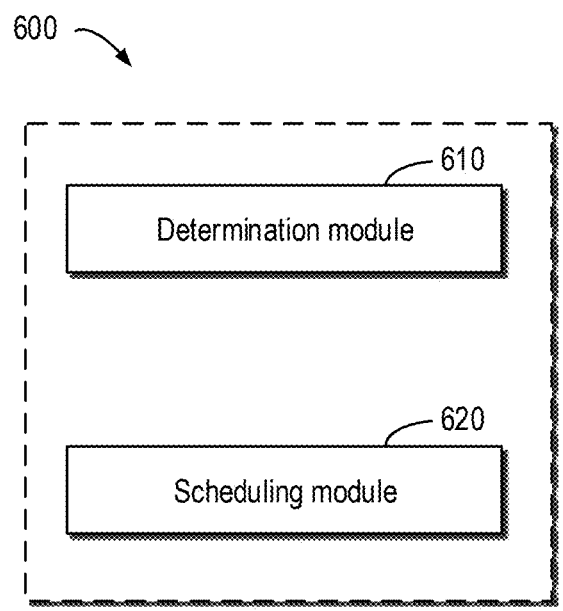
FIG. 6 illustrates a block diagram of an example apparatus according to an embodiment of the present disclosure.

FIG. 6 illustrates a block diagram of an example apparatus 600 according to some embodiments of the present disclosure. The apparatus 600 may be implemented by way of software, hardware, or a combination thereof. In some embodiments, the apparatus 600 may be implemented as an electronic device. In some embodiments, the apparatus 600 may include the scheduler 220 shown in FIG. 2.

As shown in FIG. 6, the apparatus 600 includes a determination module 610 and a scheduling module 620. The determination module 610 is configured to determine whether there is a task to be scheduled in an online task set of a waiting queue. The scheduling module 620 is configured to: in accordance with a determination that there is the task to be scheduled in the online task set, schedule the task to be scheduled in the online task set based on a preset online scheduling mode, where the preset online scheduling mode is a sequential mode, a throughput mode, or a round-robin mode.

Optionally or additionally, the scheduling module 620 may be further configured to: in accordance with a determination that there is no task to be scheduled in the online task set, schedule the task to be scheduled in an offline task set based on an offline scheduling mode, where the offline scheduling mode is a throughput mode.

In some embodiments, the sequential mode indicates that tasks to be scheduled in the online task set are scheduled in chronological order.

Exemplarily, the scheduling module 620 may be configured to: if an arrived task is an online task and the online scheduling mode is a sequential mode, add the arrived task to an urgent task queue, in the online task set, corresponding to a priority of the arrived task. Optionally, each task in the urgent task queue has a corresponding timestamp.

In some embodiments, the round-robin mode indicates that tasks to be scheduled in the plurality of resource matching task queues of the online task set are scheduled in a round-robin manner.

Exemplarily, the scheduling module 620 may be configured to: if the arrived task is an online task and the online scheduling mode is a round-robin mode, add the arrived task to a resource matching task queue, in an online task subset corresponding to a priority of the arrived task, that corresponds to a number of processing units required by the arrived task based on the priority of the arrived task and the number of processing units required by the arrived task, where different resource matching task queues in the plurality of resource matching task queues correspond to different numbers.

In some embodiments, the throughput mode indicates that tasks to be scheduled in urgent task queues of the plurality of task subsets are scheduled based on priorities first, and in case the plurality of urgent task queues are empty, tasks to be scheduled in resource matching task queues of the plurality of task subsets are scheduled based on the priorities.

Exemplarily, the task subset includes the plurality of online task subsets in the online task set, the plurality of online task subsets correspond to a plurality of different priorities, and each of the plurality of online task subsets includes an urgent task queue and a plurality of resource matching task queues. The scheduling module 620 may be configured to: determine a first number of processing units with an idle state in the plurality of processing units; determine a first target resource matching task queue in the plurality of online task subsets, where the first target resource matching task queue is a non-empty queue with a highest priority among resource matching task queues corresponding to the first number; and schedule a task to be scheduled in the first target resource matching task queue.

Exemplarily, the scheduling module 620 may be configured to: if resource matching task queues corresponding to the first number in the plurality of online task subsets are all empty, determine a second target resource matching task queue and a third target resource matching task queue in the plurality of online task subsets, where the second target resource matching task queue is a non-empty queue with a highest priority among resource matching task queues corresponding to a second number, the third target resource matching task queue is a non-empty queue with a highest priority among resource matching task queues corresponding to a third number, and a sum of the second number and the third number is equal to the first number; and schedule a task to be scheduled in the second target resource matching task queue and a task to be scheduled in the third target resource matching task queue.

Exemplarily, each resource matching task queue in the plurality of online task subsets has a corresponding weight, and the scheduling module 620 may be further configured to: for each of the remaining resource matching task queues other than the first target resource matching task queue in the plurality of online task subsets, increase the corresponding weight by a preset step value.

Exemplarily, the scheduling module 620 may be configured to: if a corresponding weight of a first resource matching task queue in the plurality of online task subsets reaches a preset threshold, add tasks in the first resource matching task queue to a first urgent task queue, where the first resource matching task queue and the first urgent task queue belong to a same online task subset.

Exemplarily, the scheduling module 620 may be configured to: if the arrived task is an offline task, add the arrived task to an offline task subset, in the offline task set, corresponding to a priority of the arrived task based on the priority of the arrived task.

Exemplarily, the scheduling module 620 may be configured to: if the arrived task is an urgent offline task, add the arrived task to an urgent task queue of the offline task subset corresponding to the priority of the arrived task; and if the arrived task is a non-urgent offline task, add the arrived task to a resource matching task queue, in the offline task subset corresponding to the priority of the arrived task, that corresponds to a required number of processing units based on the required number of processing units of the arrived task.

In some embodiments, the scheduling module 620 may be configured to: attempt to receive a new online task; if the new online task is not received through a first attempt, schedule a first predetermined number of tasks in the offline task set; and if the new online task is not received through a second attempt, schedule a second predetermined number of tasks in the offline task set, where the second predetermined number is greater than the first predetermined number.

Exemplarily, the first predetermined number of tasks include a task to be scheduled in an urgent task list of the offline task set determined based on a priority order.

The apparatus 600 of FIG. 6 can be used to implement the process described above in conjunction with FIGS. 4-5. For the purpose of brevity, details are not described here again.

The division of modules or units in the embodiments of the present disclosure is schematic, and is only a logical function division. In actual implementation, there may be another division manner. In addition, the functional units in the disclosed embodiments may be integrated into one unit, or may exist physically alone, or two or more units may be integrated into one unit. The above integrated unit may be implemented in the form of hardware, or may be implemented in the form of a software functional unit.

Figure 7:
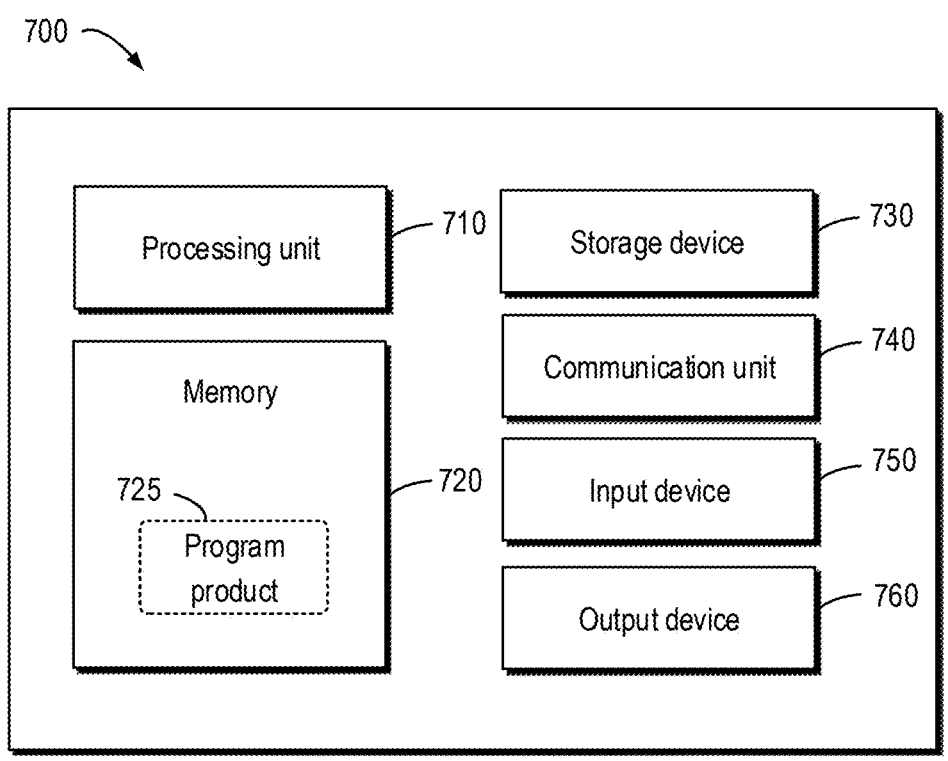
FIG. 7 illustrates a block diagram of an example device that can be used to implement the embodiments of the present disclosure.

FIG. 7 illustrates a block diagram of an example device 700 that can be used to implement the embodiments of the present disclosure. It should be understood that the device 700 shown in FIG. 7 is merely exemplary and should not constitute any limitation to the functions and scope of implementations described herein. For example, the device 700 may be used to perform the process 400 and/or process 500 described above.

As shown in FIG. 7, the device 700 is in the form of a general-purpose computing device. Components of the computing device 700 may include, but are not limited to, one or more processors or processing units 710, a memory 720, a storage device 730, one or more communication units 740, one or more input devices 750, and one or more output devices 760. The processing unit 710 may be a physical or virtual processor and may perform various processes according to a program stored in the memory 720. In a multi-processor system, multiple processing units execute computer-executable instructions in parallel to improve the parallel processing capability of the computing device 700.

The computing device 700 generally includes a plurality of computer storage media. Such media may be any available media accessible by the computing device 700, including but not limited to volatile and non-volatile media, detachable and non-detachable media. The memory 720 may be a volatile memory (for example, a register, a cache, a random access memory (RAM)), a non-volatile memory (for example, a read-only memory (ROM), an electrically erasable programmable read-only memory (EEPROM), a flash memory), or some combination thereof. The storage device 730 may be a detachable or non-detachable medium, and may include a machine-readable medium, such as a flash drive, a disk, or any other medium, which may be capable of being used to store information and/or data (for example, training data for training) and may be accessed within the computing device 700.

The computing device 700 may further include additional detachable/non-detachable and volatile/non-volatile storage media. Although not shown in FIG. 7, a disk drive for reading from or writing into a detachable, non-volatile disk (for example, a "floppy disk") and an optical disk drive for reading from or writing into a detachable, non-volatile optical disk may be provided. In these cases, each drive may be connected to a bus (not shown) through one or more data medium interfaces. The memory 720 may include a computer program product 725, which has one or more program modules configured to perform various methods or actions of various implementations of the present disclosure.

The communication unit 740 communicates with another computing device through a communication medium. In addition, functions of components of the computing device 700 may be implemented by a single computing cluster or a plurality of computing machines that can communicate through a communication connection. Therefore, the computing device 700 can operate in a networked environment using a logical connection to one or more other servers, network personal computers (PCs), or another network node.

The input device 750 may be one or more input devices, such as a mouse, a keyboard, a tracking ball, and the like. The output device 760 may be one or more output devices, such as a display, a speaker, a printer, and the like. The computing device 700 may further communicate with one or more external devices (not shown) through the communication unit 740 as needed, where the external devices are such as a storage device, a display device, and the like, communicate with one or more devices that enable a user to interact with the computing device 700, or communicate with any device (for example, a network card or a modem) that enables the computing device 700 to communicate with one or more other computing devices. Such communication may be performed via an input/output (I/O) interface (not shown).

According to an exemplary implementation of the present disclosure, there is provided a computer-readable storage medium having stored thereon computer-executable instructions, where the computer-executable instructions, when executed by a processor, implement the method described above. According to an exemplary implementation of the present disclosure, there is further provided a computer program product, which is tangibly stored on a non-transitory computer-readable medium and includes computer-executable instructions, and the computer-executable instructions, when executed by a processor, implement the method described above. According to an exemplary implementation of the present disclosure, there is provided a computer program product having stored thereon a computer program that, when executed by a processor, implements the method described above.

Various aspects of the present disclosure are described here with reference to the flowcharts and/or block diagrams of the method, apparatus, device, and computer program product implemented according to the present disclosure. It should be understood that each block of the flowcharts and/or block diagrams and a combination of the blocks in the flowcharts and/or block diagrams may be implemented by computer-readable program instructions.

These computer-readable program instructions may be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing functions/actions specified in one or more blocks in the flowcharts and/or block diagrams. These computer-readable program instructions may also be stored in a computer-readable storage medium; these instructions enable a computer, a programmable data processing apparatus, and/or another device to work in a specific manner; and therefore, the computer-readable medium storing the instructions includes a product which includes instructions that implement various aspects of functions/actions specified in one or more blocks in the flowcharts and/or block diagrams.

The computer-readable program instructions may be loaded onto a computer, another programmable data processing apparatus, or another device, so that a series of operation steps are performed on the computer, the another programmable data processing apparatus, or the another device, to produce a computer-implemented process, such that the instructions executed on the computer, the another programmable data processing apparatus, or the another device implement the functions/actions specified in one or more blocks in the flowcharts and/or block diagrams.

The flowcharts and block diagrams in the accompanying drawings show possibly implemented architecture, functions, and operations of the system, method, and computer program product according to a plurality of implementations of the present disclosure. In this regard, each block in the flowchart or block diagram may represent a part of a module, program segment, or instruction, and the part of the module, program segment, or instruction contains one or more executable instructions for implementing the specified logical functions. In some alternative implementations, functions marked in the blocks may also occur in an order different from that marked in the accompanying drawings. For example, two blocks shown in succession may actually be performed substantially in parallel, or they may sometimes be performed in a reverse order, depending on a function involved. It should also be noted that each block in the block diagram and/or the flowchart, and a combination of the blocks in the block diagram and/or the flowchart may be implemented by a dedicated hardware-based system that executes specified functions or actions, or may be implemented by a combination of dedicated hardware and computer instructions.

The foregoing describes various implementations of the present disclosure. The foregoing descriptions are exemplary, not exhaustive, and are not limited to the disclosed implementations. Many modifications and changes are obvious to those of ordinary skill in the art without departing from the scope and spirit of the described implementations. The selection of terms used herein aims to best explain the principles, practical applications, or improvements to the technology in the market of the implementations, or to enable other ordinary skilled persons in the art to understand the implementations disclosed herein.

We claim:

1. A method for task scheduling, comprising:
determining, by an electronic device, whether there is a task to be scheduled in an online task set of a waiting queue; and
in accordance with a determination that there is the task to be scheduled in the online task set, scheduling, by the electronic device, the task to be scheduled in the online task set based on a preset online scheduling mode, wherein the preset online scheduling mode comprises a sequential mode, a throughput mode, or a round-robin mode, wherein the sequential mode indicates that tasks to be scheduled in the online task set are scheduled in a chronological order, wherein the round-robin mode indicates that tasks to be scheduled in a plurality of resource matching task queues of the online task set are scheduled in a round-robin manner, wherein the throughput mode indicates that tasks to be scheduled in urgent task queues of a plurality of task subsets are scheduled based on priorities first, and in case the plurality of urgent task queues are empty, tasks to be scheduled in resource matching task queues of the plurality of task subsets are scheduled based on the priorities;
in accordance with a determination that there is no task to be scheduled in the online task set, scheduling, by the electronic device, the task to be scheduled in an offline task set based on an offline scheduling mode, where the offline scheduling mode comprises the throughput mode;
configuring at least one processing engine of the electronic device to process the task;
wherein the task subsets comprise a plurality of online task subsets in the online task set, the plurality of online task subsets correspond to a plurality of different priorities, and each of the plurality of online task subsets comprises an urgent task queue and a plurality of resource matching task queues,
and wherein scheduling tasks to be scheduled in resource matching task queues of the plurality of task subsets based on priorities comprises:
determining a first number of processing units with an idle state in a plurality of processing units;
determining a first target resource matching task queue in the plurality of online task subsets, wherein the first target resource matching task queue is a non-empty queue with a highest priority among resource matching task queues corresponding to the first number; and
scheduling tasks to be scheduled in the first target resource matching task queue
in accordance with a determination that resource matching task queues corresponding to the first number in the plurality of online task subsets are all empty, determining a second target resource matching task queue and a third target resource matching task queue in the plurality of online task subsets, wherein the second target resource matching task queue is a non-empty queue with a highest priority among resource matching task queues corresponding to a second number, the third target resource matching task queue is a non-empty queue with a highest priority among resource matching task queues corresponding to a third number, and a sum of the second number and the third number is equal to the first number; and
scheduling a task to be scheduled in the second target resource matching task queue and a task to be scheduled in the third target resource matching task queue.

2. The method of claim 1, further comprising:
in accordance with a determination that an arrived task is an online task and the online scheduling mode is the sequential mode, adding the arrived task to an urgent task queue, in the online task set, corresponding to a priority of the arrived task.

3. The method of claim 2, wherein each task in the urgent task queue has a corresponding timestamp.

4. The method of claim 1, further comprising:
in accordance with a determination that an arrived task is an online task and the online scheduling mode is the round-robin mode, adding the arrived task to a resource matching task queue, in an online task subset corresponding to a priority of the arrived task, that corresponds to a number of processing units required by the arrived task based on the priority of the arrived task and the number of processing units required by the arrived task, wherein different resource matching task queues in the plurality of resource matching task queues correspond to different numbers.

5. The method of claim 1, wherein each resource matching task queue in the plurality of online task subsets has a corresponding weight, and the method further comprises:
for each of remaining resource matching task queues other than the first target resource matching task queue in the plurality of online task subsets, increasing the corresponding weight by a preset step value.

6. The method of claim 5, further comprising:
in accordance with a determination that a corresponding weight of a first resource matching task queue in the plurality of online task subsets reaches a preset threshold, adding tasks in the first resource matching task queue to a first urgent task queue, where the first resource matching task queue and the first urgent task queue belong to a same online task subset.

7. The method of claim 1, wherein scheduling the task to be scheduled in the offline task set comprises:
attempting to receive a new online task;

in accordance with a determination that the new online task is not received through a first attempt, scheduling a first predetermined number of tasks in the offline task set; and in accordance with a determination that the new online task is not received through a second attempt, scheduling a second predetermined number of tasks in the offline task set, where the second predetermined number is greater than the first predetermined number.

8. The method of claim 7, wherein the first predetermined number of tasks include a task to be scheduled, in an urgent task list of the offline task set, determined based on a priority order.

9. The method of claim 1, further comprising:

in accordance with a determination that an arrived task is an offline task, adding the arrived task to an offline task subset, in the offline task set, corresponding to a priority of the arrived task based on the priority of the arrived task.

10. The method of claim 9, further comprising:

in accordance with a determination that the arrived task is an urgent offline task, adding the arrived task to an urgent task queue of the offline task subset corresponding to the priority of the arrived task; and in accordance with a determination that the arrived task is a non-urgent offline task, adding the arrived task to a resource matching task queue, in the offline task subset corresponding to the priority of the arrived task, that corresponds to a required number of processing units based on the required number of processing units of the arrived task.

11. An electronic device, comprising:

at least one processing unit;

at least one memory, the at least one memory being coupled to the at least one processing unit and storing instructions executable by the at least one processing unit, and the instructions, when executed by the at least one processing unit, causing the electronic device to perform actions, the actions comprising:

determining whether there is a task to be scheduled in an online task set of a waiting queue; and in accordance with a determination that there is the task to be scheduled in the online task set, scheduling the task to be scheduled in the online task set based on a preset online scheduling mode, wherein the preset online scheduling mode comprises a sequential mode, a throughput mode, or a round-robin mode, wherein the sequential mode indicates that tasks to be scheduled in the online task set are scheduled in a chronological order, wherein the round-robin mode indicates that tasks to be scheduled in a plurality of resource matching task queues of the online task set are scheduled in a round-robin manner, wherein the throughput mode indicates that tasks to be scheduled in urgent task queues of a plurality of task subsets are scheduled based on priorities first, and in case the plurality of urgent task queues are empty, tasks to be scheduled in resource matching task queues of the plurality of task subsets are scheduled based on the priorities;

in accordance with a determination that there is no task to be scheduled in the online task set, scheduling, by the electronic device, the task to be scheduled in an offline task set based on an offline scheduling mode, where the offline scheduling mode comprises the throughput mode; and configuring at least one processing engine of the electronic device to process the task;

wherein the task subsets comprise a plurality of online task subsets in the online task set, the plurality of online task subsets correspond to a plurality of different priorities, and each of the plurality of online task subsets comprises an urgent task queue and a plurality of resource matching task queues, and wherein scheduling tasks to be scheduled in resource matching task queues of the plurality of task subsets based on priorities comprises:

determining a first number of processing units with an idle state in a plurality of processing units;

determining a first target resource matching task queue in the plurality of online task subsets, wherein the first target resource matching task queue is a non-empty queue with a highest priority among resource matching task queues corresponding to the first number; and scheduling tasks to be scheduled in the first target resource matching task queue in accordance with a determination that resource matching task queues corresponding to the first number in the plurality of online task subsets are all empty, determining a second target resource matching task queue and a third target resource matching task queue in the plurality of online task subsets, wherein the second target resource matching task queue is a non-empty queue with a highest priority among resource matching task queues corresponding to a second number, the third target resource matching task queue is a non-empty queue with a highest priority among resource matching task queues corresponding to a third number, and a sum of the second number and the third number is equal to the first number; and scheduling a task to be scheduled in the second target resource matching task queue and a task to be scheduled in the third target resource matching task queue.

12. A non-transitory computer-readable storage medium having stored thereon a computer program that, when executed by a processor, implements a method comprising:

determining whether there is a task to be scheduled in an online task set of a waiting queue; and in accordance with a determination that there is the task to be scheduled in the online task set, scheduling the task to be scheduled in the online task set based on a preset online scheduling mode, wherein the preset online scheduling mode comprises a sequential mode, a throughput mode, or a round-robin mode, wherein the sequential mode indicates that tasks to be scheduled in the online task set are scheduled in a chronological order, wherein the round-robin mode indicates that tasks to be scheduled in a plurality of resource matching task queues of the online task set are scheduled in a round-robin manner, wherein the throughput mode indicates that tasks to be scheduled in urgent task queues of a plurality of task subsets are scheduled based on priorities first, and in case the plurality of urgent task queues are empty, tasks to be scheduled in resource matching task queues of the plurality of task subsets are scheduled based on the priorities;

in accordance with a determination that there is no task to be scheduled in the online task set, scheduling, by an electronic device, the task to be scheduled in an offline task set based on an offline scheduling mode, where the offline scheduling mode comprises the throughput mode; and configuring at least one processing engine of the electronic device to process the task;

wherein the task subsets comprise a plurality of online task subsets in the online task set, the plurality of online task subsets correspond to a plurality of different priorities, and each of the plurality of online task subsets comprises an urgent task queue and a plurality of resource matching task queues, and wherein scheduling tasks to be scheduled in resource matching task queues of the plurality of task subsets based on priorities comprises:

determining a first number of processing units with an idle state in a plurality of processing units;

determining a first target resource matching task queue in the plurality of online task subsets, wherein the first target resource matching task queue is a non-empty queue with a highest priority among resource matching task queues corresponding to the first number; and scheduling tasks to be scheduled in the first target resource matching task queue in accordance with a determination that resource matching task queues corresponding to the first number in the plurality of online task subsets are all empty, determining a second target resource matching task queue and a third target resource matching task queue in the plurality of online task subsets, wherein the second target resource matching task queue is a non-empty queue with a highest priority among resource matching task queues corresponding to a second number, the third target resource matching task queue is a non-empty queue with a highest priority among resource matching task queues corresponding to a third number, and a sum of the second number and the third number is equal to the first number; and scheduling a task to be scheduled in the second target resource matching task queue and a task to be scheduled in the third target resource matching task queue.

* * * * *